Dec. 31, 1946.  H. J. McCARTHY  2,413,364
ULTRA HIGH FREQUENCY OSCILLATOR
Filed June 12, 1943  2 Sheets-Sheet 1

INVENTOR
Henry J. McCarthy
BY Lawrence Burns
ATTORNEY

UNITED STATES PATENT OFFICE 2,413,364

ULTRA HIGH FREQUENCY OSCILLATOR

Henry J. McCarthy, Danvers, Mass., assignor to Sylvania Electric Products Inc., Salem, Mass., a corporation of Massachusetts Application June 12, 1943, Serial No. 490,703

2 Claims. (Cl. 250—27.5)

This invention relates to electrical oscillation devices with particular reference to ultra high frequency or short wave oscillations.

An object of this invention is to provide improved means for supporting short wave electrical oscillations, and method of making said means.

Another object is to provide means, in an oscillator, for maintaining the oscillation wavelength at an effectively constant value despite temperature variation.

Other objects, advantages, and features will be apparent from the following specification taken in conjunction with the accompanying drawings in which.

Figure 1:
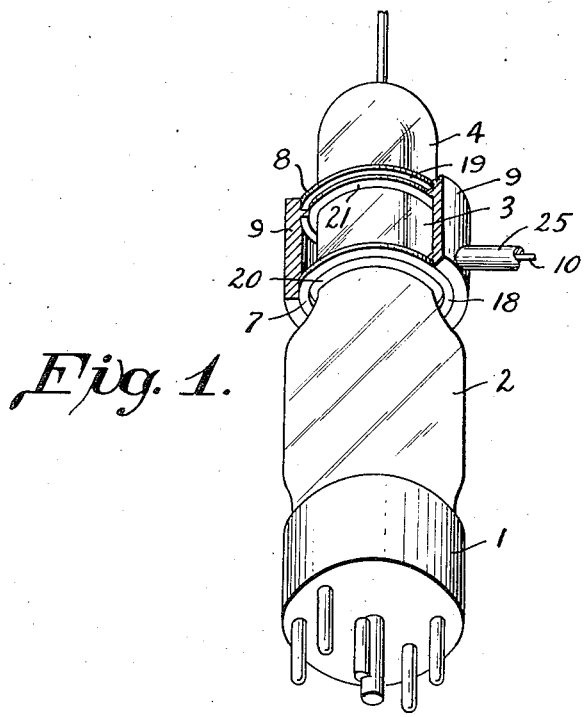
Figure 1 is a perspective view of a tube embodying this invention.

The general nature of the device embodying this invention is that of a tube for the generation of electrical short waves, having metal plates as part of an oscillation circuit, and grids mounted on the plates.

An important disadvantage in a tube of this nature has been the undesirable change in wavelength produced by the effect of heat variation on the plates. Dimensional or positional change in the plates or parts thereof, as a result of heat variation, tended to change the capacitance or inductance, or both, in the oscillation circuit, with resultant undesirable tendency to change the wavelength.

Another disadvantage has been that grids mounted on the plates before the sealing of the plates in the walls of the envelope, were liable to be damaged by, or collect impurities during, the sealing operation.

This invention obviates the above disadvantages by so forming the plates that heat variation causes opposing tendencies of movement therein and the wavelength is effectively maintained at a constant value; and by sealing the plates in the glass envelope without the grids and providing grid assemblies and means for removably mounting them on the plates, whereby the grids may be mounted on the plates after the sealing operation of the plates to the glass envelope has been completed.

The illustrative embodiment of this invention as shown in the drawings provides a tube base 1; a glass envelope having a lower portion 2, a central portion 3, and an upper portion 4; electrodes 5 and 6 for supporting an electron flow therebetween within the glass envelope; and a pair of metal plates 7 and 8 which are hermetically sealed in the wall of the glass envelope and which separate the portions 2 and 3 and 4 of the envelope wall.

An oscillatory circuit is provided by the plates 7 and 8 and their connection housing 9 outside the glass envelope as the inductance, and the separation of the plates 7 and 8 within the envelope as the capacitance.

The flow of electrons between the electrodes 5 and 6 past the plates 7 and 8 sets up oscillations in the oscillatory circuit. These oscillations are picked up by the lead 10 and provide short electrical waves.

Ordinarily, heat variation in the plates 7 and 8, brought about through the operation of the tube, would so affect the plates 7 and 8 as to vary the gap therebetween and consequently the capacitance of the circuit, as well as to vary the dimensions of the plates and the connection housing and consequently the inductance of the circuit. This action would undesirably change the wavelength provided by the circuit.

The plates 7 and 8 are provided with annular portions 11 and 12 respectively, formed to counteract and effectively neutralize the tendency of heat variation to change the wavelength of the oscillatory circuit.

Plates 7 and 8 also have turned lips 13 and 14 respectively, defining central cylindrical openings in which grid units 15 and 16 are mounted, being held by clips struck from the plates, as at 17 in plate 8.

Plates 7 and 8 are further provided with peripheral flanges 18 and 19 which define annular sections 20 and 21 to which the glass portions 2, 3, and 4 of the glass envelope are hermetically sealed. The flanges 18 and 19 provide a seat for the annular connection housing 9, as at 22 and 23.

The pick up loop 24 of the lead 10 extends within the cavity formed outside the glass envelope between the plates 7 and 8 and within the connection housing 9. The sleeve 25 through which the pick up lead 10 extends, provides a second pick up lead.

Figure 3:
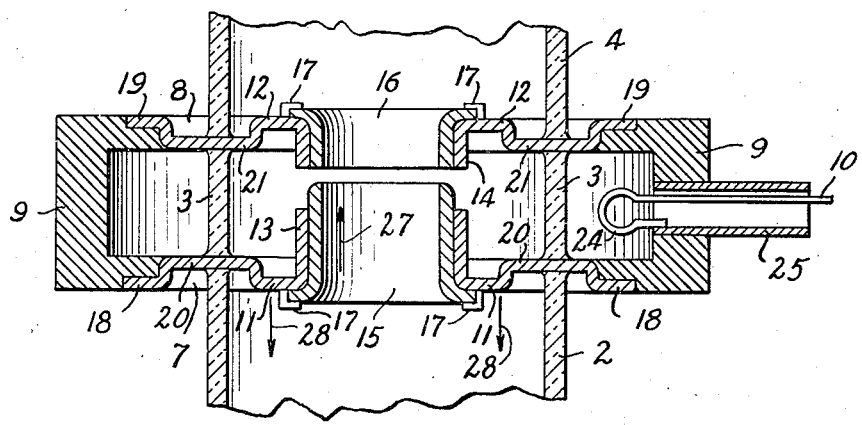
Figure 3 is a section view, in part, of the structure of Figure 1, illustrating the oscillatory circuit.
Figure 2:
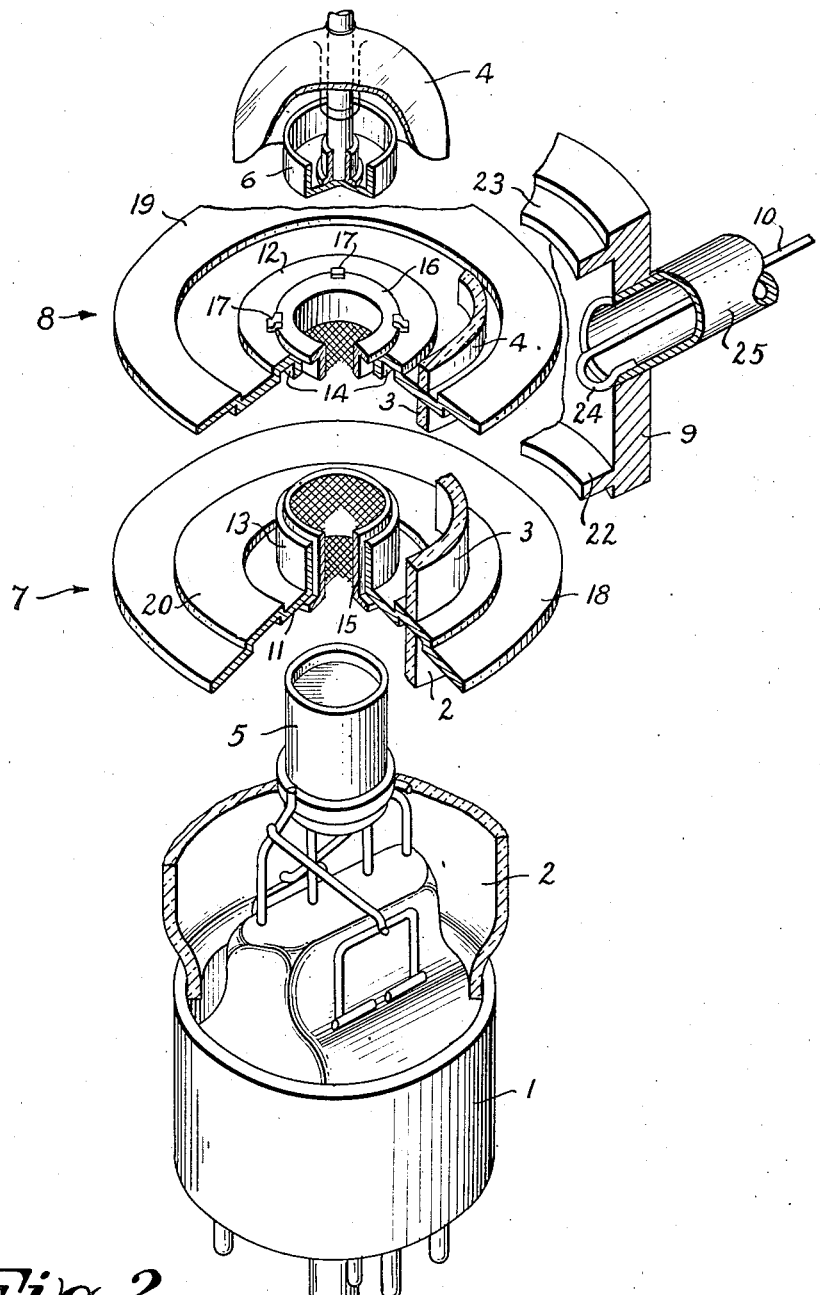
Figure 2 is an exploded view of the structure of Figure 1.

The action of the temperature variation compensation arrangement is illustrated in Figure 3. With the metal plate 7 anchored to the glass envelope parts 2 and 3, the normal tendency, under the action of heat, is for the lip 13 to move in the direction of arrow 27. The formation of the annular portion 11 of plate 7 as a depression in opposition to the direction of the lip 13 causes the central portion of the plate 7 to move bodily in the direction of the arrows 28, under the action of heat, and thus counteract and neutralize the movement of the lip 13.

It is desirable to slightly more than counteract the movement of the lip 13 to offset the effect of the dimensional change in the peripheral portions of the plates 7 and 8, and in the connection housing 9.

Thus through similar arrangement of the annular portion 12 of the plate 8, the relation between the inductance and capacity of the oscillatory circuit remains such that the resultant wavelength is effectively maintained constant under the action of heat variation.

In assembling the tube of this invention the glass envelope portions 2, 3 and 4 are sealed to the plates 7 and 8 while the bottom of portion 2 and the top of portion 4 are open, and without the grid units 15 and 16.

When the sealing in of the plates 7 and 8 has been completed, the grid units 15 and 16 are mounted on the plates 7 and 8 and clamped in place as by clips 17, and thereafter the glass portion 2 is sealed to base 1 and the glass portion 4 is sealed about the electrode lead 29.

What I claim is:

1. An electrical short wave generator tube comprising an hermetically sealed glass envelope; a pair of electrodes in said envelope for supporting an electron flow therebetween; a pair of annular metal plates between said electrodes, spaced therefrom and extending through the wall of said envelope and having spaced, aligned, lipped openings through which said electron flow may pass within said envelope, each of said plates having a concentric annular depression therein within the envelope and between said envelope and the inner edge of said annular plate to counteract the movement of said lipped openings under heat variation; a grid in each of said openings; and an electrical connection between said plates and outside said envelope.

2. An electrical short wave generator tube comprising a hermetically sealed glass envelope, a pair of electrodes in said envelope for supporting an electron flow therebetween, a pair of annular metal plates extending through the wall of said envelope and having spaced, aligned openings within said envelope in line with the path of said electron flow, each of said plates having a turned lip on its edge within said envelope, and each of said plates having a depression therein within the envelope to counteract the movement of said lips under heat variation, a grid assembly removably held in each of said openings by spaced clips on the respective plates, each assembly comprising a grid support and a grid mounted therein, and an electrical connection between said plates and outside said envelope.

HENRY J. McCARTHY.